US006299213B1

(12) United States Patent
Souparis

(10) Patent No.: US 6,299,213 B1
(45) Date of Patent: Oct. 9, 2001

(54) SECURITY MARKING LABEL, PARTICULARLY FOR MOTOR VEHICLE

(75) Inventor: Hugues Souparis, Nogent sur Marnes (FR)

(73) Assignee: Hologram Industries, S.A. (FR)

( * ) Notice: Subject to any disclaimer, the term of this patent is extended or adjusted under 35 U.S.C. 154(b) by 0 days.

(21) Appl. No.: 09/099,884

(22) Filed: Jun. 17, 1998

Related U.S. Application Data

(63) Continuation of application No. PCT/FR96/01648, filed on Oct. 22, 1996.

(30) Foreign Application Priority Data

Dec. 22, 1995 (FR) .................................................. 95/15435

(51) Int. Cl.$^{7}$ ........................................................ B32B 3/14

(52) U.S. Cl. ................................ 283/81; 283/74; 283/91; 283/107; 283/109; 283/904

(58) Field of Search ................................ 283/74, 91, 107, 283/109, 904

(56) References Cited

U.S. PATENT DOCUMENTS 4,608,288 * 8/1986 Spindler ................................ 283/109

FOREIGN PATENT DOCUMENTS

| | | |
|---|---|---|
| 44 05 946 C1 | 6/1995 | (DE) . |
| 44 14 149 A1 | 11/1995 | (DE) . |
| 0 170 712 A1 | 2/1986 | (EP) . |
| 0 218 524 A1 | 4/1987 | (EP) . |
| 0 505 689 A1 | 9/1992 | (EP) . |
| 2 699 312 | 6/1994 | (FR) . |

* cited by examiner

*Primary Examiner*—Willmon Fridie, Jr.
*Assistant Examiner*—Mark T. Henderson
(74) *Attorney, Agent, or Firm*—Schnader Harrison Segal & Lewis LLP

(57) ABSTRACT

The invention relates to a security marking label for a transparent support such as the windshield of a motor vehicle. The label comprises information specific to the marked support. The label is comprised of a complex formed of two superimposed elements between which is interleaved a marking element, at least one of said elements having a layer appropriate to provide for the binding of the transparent support and at least one of said elements comprising a diffraction network.

10 Claims, 2 Drawing Sheets

SECURITY MARKING LABEL, PARTICULARLY FOR MOTOR VEHICLE

RELATED APPLICATION

This is a continuation of International Application No. PCT/FR96/01648, with an international filing date of Oct. 22, 1996, which is based on French Patent Application No. 95/15435, filed Dec. 22, 1995.

BACKGROUND OF THE INVENTION

1. Field of the Invention

The present invention pertains to highly secure marking labels for the visible or partially coded identification of a glass panel such as an automobile windshield. The information must be definitively affixed to the interior of the passenger compartment, on the glass panel, and be visible from the exterior. This can be the case for documents such as, for example, automobile registration stickers, proof of insurance or tax stickers. These documents bear general information supplemented by specific information pertaining to the vehicle or its owner.

2. Description of Related Art

Various types of such labels are already known in the state of the art. One can cite French patent FR 2716559 pertaining to a plaque designed for marking, certification and/or control operations which can be applied on a transparent support surface. It comprises a plastic film support, an imprint on its first surface and a first transparent adhesive layer applied on this imprint, as well as a first removable protective coating. A second adhesive layer is applied to the second support surface and is covered by a second removable protective coating. A control coupon is applied on the second coating by means of a third adhesive layer. The support and the coupon bear mutually corresponding information. Nevertheless, the devices according to the state of the art do not provide a high level of security against fraud, and it is relatively easy to peel off an original document and to modify the personalization information in an undetectable manner.

SUMMARY OF THE INVENTION

The object of the present invention is to resolve this drawback by proposing a highly secure marking label that limits the possibilities of fraud stemming from either forgery or reuse of an original label.

For this purpose, the invention pertains more specifically to a highly secure marking label to be affixed on a transparent support such as a vehicle windshield and bearing information specific to the marked support, characterized in that it is constituted by a complex formed by two superimposed elements, between which is interposed a marking element, with at least one of said elements exhibiting a layer that assures bonding onto the transparent support and with at least one of said elements bearing a diffraction grating.

Advantageously, the first element is formed by a transparent plastic film bearing on one of its surfaces an adhesive to enable bonding of said element onto the transparent support to be marked and exhibiting on the other surface an easily broken layer and a transparent lacquer layer stamped with a holographic image.

Said transparent lacquer layer is preferably stamped with a holographic image that covers the entire surface of said element.

According to a preferred mode of implementation, the second element is appreciably larger than the first element.

The second element is preferably constituted by a transparent film coated with an easily broken layer and a layer of metallized lacquer stamped with a holographic image and by an adhesive capable of bonding said element onto the transparent support to be marked and onto the element.

According to a variant, the second element in addition bears an adhesive layer for the gluing on of a protective film.

According to a first mode of implementation, the personalization information is printed on the stamped surface of the first element.

According to a second mode of implementation, the personalization information is printed on the marking element.

According to a third mode of implementation, some of the personalization information is masked by a spectrally selective transmission layer.

According to a specific mode of realization, the first element comprises a layer of lacquer that is opaque in the visible and transparent in a given wavelength band such that the coded information is hidden from unauthorized persons.

BRIEF DESCRIPTION OF THE DRAWINGS

Better comprehension of the invention will be provided by the description below with reference to the attached drawings in which.

DETAILED DESCRIPTION

Figure 1:
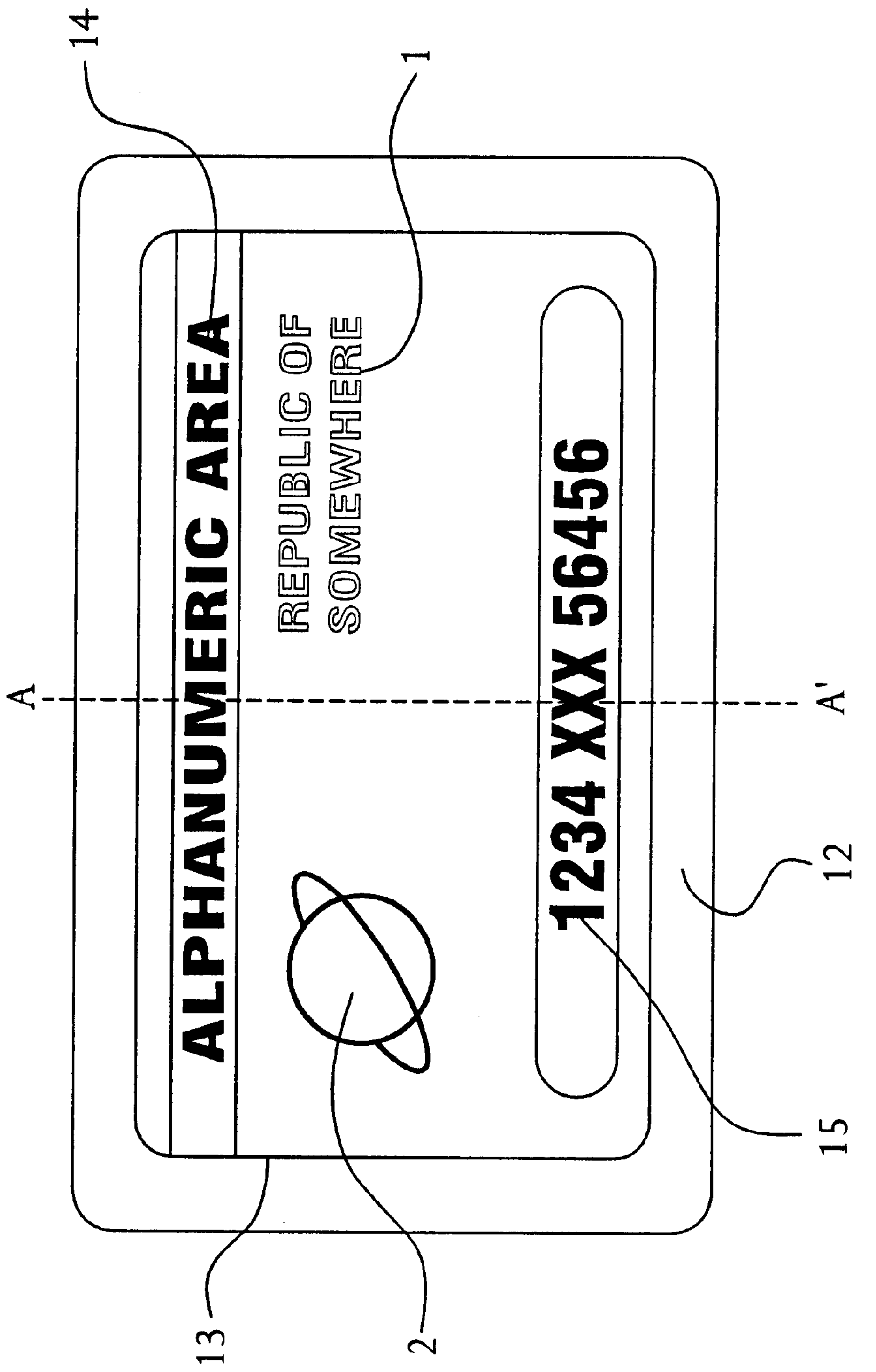
FIG. 1 shows a front view of a label according to the invention.

FIG. 1 shows a front view of a label according to the invention. It exhibits various types of information. Certain information (1) is imprinted in an invariable and identical manner for all of the labels. Other information (2) is formed by diffraction grids forming a holographic security image. Other information (14) is specific to the marked support and is variable from one label to another. Finally, certain information (15) is specific to the marked support and variable from one label to another and is protected by a transparent diffraction grid.

The second element (12) of the label exhibits a surface larger than that of the first element (13) and protrudes laterally.

The second element (12) can exhibit breakage starting points to make the label easily broken and to make fraud more difficult.

Figure 2:
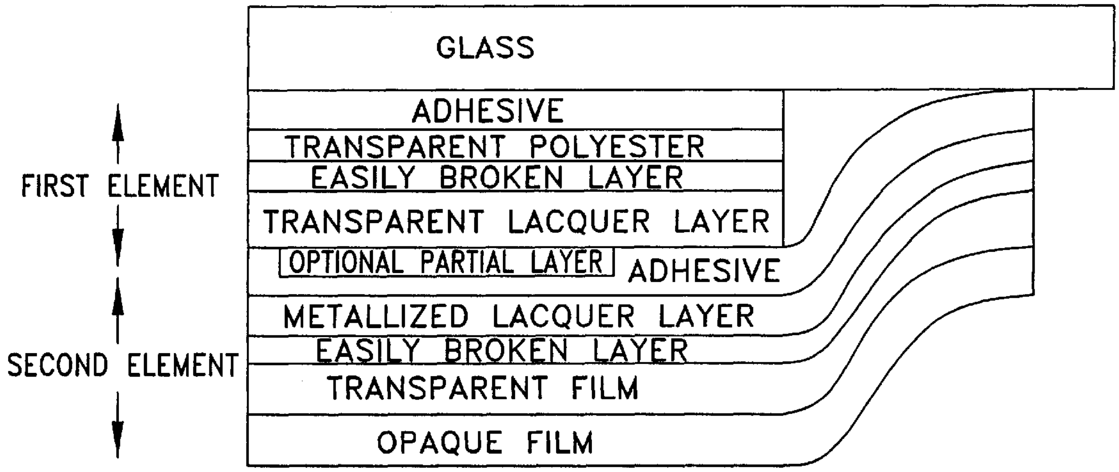
FIGS. 2 and 3 show a sectional view of a label according to the invention.
Figure 3:
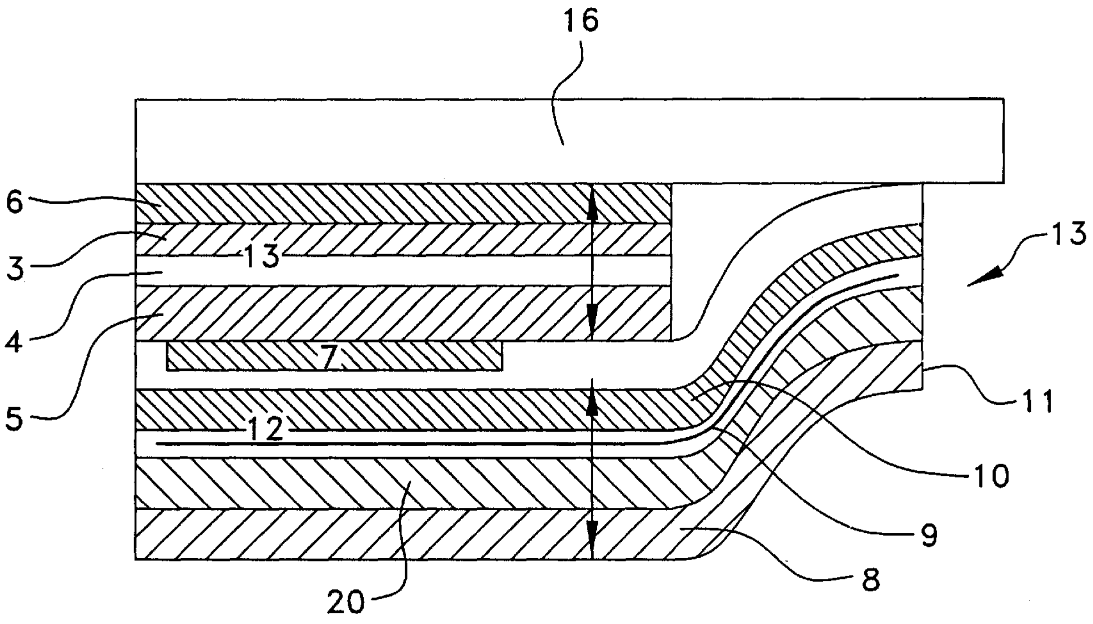

FIGS. 2 and 3 show views along section AA' at an enlarged scale.

The label is glued onto a glass surface (16) by an adhesive layer (6) provided on one of the surfaces of a support film (3), for example, a transparent polyester film. The other surface of the support film (3) can be covered by an easily broken layer (4) and by a transparent lacquer layer (5) stamped with a holographic image on its entire surface. Any attempt to separate this layer will cause the total destruction of the image.

The layer (5) can also be implemented in the form of a metallized or partially metallized stamping lacquer. This layer creates one or more windows through which the imprints (1) or (14) can be seen.

In addition, the label has an optional partial layer (7) of lacquer which is opaque in the visible and transparent in a given wavelength band, for example, in the infrared. This layer (7) makes it possible to mask certain coded information (15), the access to which is limited to people authorized to perform monitoring operations by means of a specific device, for example, an infrared light source.

This layer (7) is affixed by offset printing at the time of mass production of the label (before personalization).

The second element (12) guarantees that the marking element can not be moved. Any attempt to peel off the marking label (fraudulent reuse of an original label) causes the tearing of the delimited zone due to the surface difference of the two elements. Any attempt to separate the two elements constituting the marking label (tampering) causes the destruction of the surface common to the two elements. The second element (12) comprises:

a stamped metallized lacquer layer (10)

an easily broken layer (9)

a transparent polyester film (20) of the same type as the film (3).

The second element (12) is glued onto the first element by means of a glue layer (11) with the same characteristics as the glue (6) of the first element.

The second element can also be covered on the exterior by a thick, opaque film (8), with this film (8) being advantageously an adhesive protective film.

The labels can be manufactured as follows:

A first labeling machine places the first element (13) on a siliconized film and then personalizes it with an ink-jet or thermal printer. The personalized and possibly partially coded information is printed on the stamped surface of the transparent laquer layer (5) or possibly on the optional partial layer (7). A second labeling machine then places the second larger element (12) on the first element.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures.

I claim:

1. A marking label for a transparent support comprising a first element superimposed on a second element with a marking element interposed between the first and second elements, wherein the first element comprises a support film having, on a first surface, a first layer of adhesive adapted to bond the first element onto the transparent support and having, on a second surface, an easily broken layer and a transparent lacquer layer stamped with a holographic image, and wherein at least one of the two superimposed elements has a layer for bonding the marking label onto the transparent support and at least one of the two superimposed elements has a diffraction grating.

2. The marking label of claim 1, wherein the holographic image covers substantially the entire second surface of the first element.

3. The marking label of claim 1, wherein personalization information is printed on the stamped surface of the first element.

4. The marking label of claim 1, further comprising a second layer of said adhesive of said first layer between the first and second elements.

5. The marking label of claim 1, wherein the second element is larger than the first element.

6. The marking label of claim 1, wherein the second element comprises a transparent film having, on a first surface, an easily broken layer and a metallized lacquer layer stamped with a holographic image.

7. The marking label of claim 6, wherein the transparent film of the second element has, on a second surface, an adhesive protective film.

8. The marking label of claim 1, further comprising a spectrally selective transmission layer between the first and second elements and adapted to mask certain personalization information printed on the second element.

9. The marking label of claim 8, wherein the spectrally selective transmission layer is substantially opaque in a visible wavelength band and substantially transparent in a non-visible wavelength band.

10. The marking label of claim 1, wherein:

the holographic image covers substantially the entire second surface of the first element;

personalization information is printed on the stamped surface of the first element;

the second element is larger than the first element;

the second element comprises a transparent film having, on a first surface, an easily broken layer and a metallized lacquer layer stamped with a holographic image and having, on a second surface, an adhesive protective film; and the marking label further comprises:

a second layer of said adhesive of said first layer between the first and second elements; and a spectrally selective transmission layer between the first and second elements and adapted to mask certain personalization information printed on the second element, wherein the spectrally selective transmission layer is substantially opaque in a visible wavelength band and substantially transparent in a non-visible wavelength band.

* * * * *